3,551,249
METHOD OF BONDING OIL-FILMED SURFACES WITH A SOLVENT-FREE EPOXY RESIN
John W. Harp, Minneapolis, and William L. Minarik, Roseville, Minn., assignors to H. B. Fuller Company, St. Paul, Minn., a corporation of Minnesota
No Drawing. Filed July 18, 1966, Ser. No. 565,698
Int. Cl. C09j 5/00; B32b 27/38
U.S. Cl. 156—330
9 Claims

ABSTRACT OF THE DISCLOSURE

A method of bonding together two surfaces at least one of which is oil-coated, without need for cleaning same, by forming a solvent-free epoxy resin bonding agent which is formed of 50–95% by weight of diglycidyl ether of bisphenol A and of the balance a polyglycol epoxy resin and adding a quantity of hardener thereto, and applying a thin film of that agent to at least one of said surfaces before bringing them together for bonding.

---

The present invention is directed to a method of epoxy bonding two or more surfaces together at least one of which has an oil coated surface.

It is a general object of our invention to provide a novel and effective method of bonding contiguous surfaces together despite the presence of an oil film thereon.

Epoxy resin compositions have enjoyed a broad commercial success since their introduction. They have found application as adhesives, molding compositions and as potting compounds for encapsulating. This latter use has involved primarily two classes of epoxy materials—expanded or foamed epoxies and so-called flexible epoxies. It is to a material of the latter type utilized as an adhesive that the present invention is directed.

In bonding of two surfaces together using prior art epoxy adhesives (or most other classes of adhesives for that matter), the user of the adhesive has had to use great care to insure that the surfaces to be bonded were free of foreign materials—particularly oils. Unless such scrupulous cleanliness was observed the epoxy adhesives would not adhere to the surfaces. We have discovered that such scrupulous cleanliness is not necessary if one utilizes certain classes of epoxy compositions as will be described below.

We have found that by utilizing a polyglycol base resin as a component in the preparation of our epoxy adhesive, that the resultant product has unexpected marked ability to produce an effective bond between two steel surfaces, at least one of which is oil coated at the time of application of the epoxy adhesive. We have found that if certain proportions of such a polyglycol base resin is mixed with certain proportions, as hereinafter set out, of a diglycidyl ether of bis phenol A and a hardener such as is well known in the art, an oil-penetrating epoxy adhesive is produced which will bond oil bearing metal or other oil coated surfaces together with great and unexpected strength.

As illustrative of both the use and application of the present invention the case of bonding of steel samples having a mill oil surface coating will be used. Normally this kind of an oil film would act to prevent effective bonding of steel to steel using epoxy adhesives.

Four inch square steel panels ⅛ inch in thickness were used for bonding tests. A one inch lap joint was prepared by applying an epoxy adhesive in a film from 0.5 to 10 mils in thickness. Greater thicknesses are possible, but good bonding practice is within this range, with a preferred range of 2 to 5 mils. Following curing of the resin under time and/or temperature the bonded samples were sawed into strips to provide one square inch bonded joints for tests.

Samples tested included steel that had first been cleaned to give a degreased surface and samples which had been deliberately given an oil film prior to application of the epoxy adhesive by placing several drops of a fine mill oil on the surface.

The epoxy compositions used in the tests were used both with and without the addition of filler materials. Filler materials having oil absorptive properties did not impart bonding characteristics to oil coated surfaces for the epoxy compositions not containing a polyglycol base resin. For polyglycol containing epoxy adhesives the presence of fillers generally is desirable, but not a prerequisite of bonding to oil coated surfaces. The preferred form of the invention utilizes an epoxy formulation as follows:

| | Parts by weight |
|---|---|
| Shell Chemical Co. Epon 828 | 80 |
| Dow Chemical Co. DER 732 | 20 |
| Polyamide resin up to 50. | |

Epon 828 is a diglycidyl ether of bis phenol A, while DER 732 is a flexible liquid epoxy resin based on polyglycol. Various polyamide curing agents may be used. A satisfactory one is supplied by General Mills, Inc. under the trade name Versamid. The choice of curing agent will be dictated by the particular cure cycle desired or by cost considerations. A wide variety of curing agents are useful.

While not required in the invention inert filler materials may be advantageously employed. A 50 parts by weight addition to the above formulation of finely divided calcium carbonate or a smaller amount of pyrogenic silica (5 to 10 parts by weight) such as Cabosil available from Godfrey and Cabot Co. of Boston, Mass., is satisfactory.

While the formulation will cure at room temperature, the bond strength to oil coated surfaces is markedly improved by elevation of temperature and by increased curing time. This is shown by the data produced below using ASTM test methods.

| Curing cycle: | Bond shear strength, p.s.i. |
|---|---|
| 300° F. for 1 hour | 2600 |
| 158° F. for 1 hour | 400 |
| 158° F. for 1½ hours | 1970 |
| 158° F. for 2 hours | 2000 |
| Room temperature for 7 days | 980 |

By comparison oil-free steel bonded using the identical epoxy using a cure cycle of room temperature for 7 days gave a bond shear strength of 1800 p.s.i.

The choice of hardener or curing agent will, as is known in the art, dictate the conditions to be used in a cure cycle. For example, using the polyamide type curing agent provides, in general, a maximum cohesive strength when cured at 200–225° F. Increasing the cure temperature to above room temperature (150° F. or above) provides higher adhesion to the oil contaminated surface apparently due to increased penetration efficiency.

While the figures above show that a marked improvement in bonding effectiveness arises through the use of elevated temperatures in the curing of the adhesive, it should be understood that even at room temperature the use of polyglycol resin containing epoxy adhesives, in accordance with the present invention, gives vastly improved adhesion over epoxy adhesives not incorporating polyglycol epoxy resins.

Other epoxy adhesive formulations which did not incorporate a polyglycol resin epoxy proved incapable of providing useful adherence whether cured at room temperature or at elevated temperatures. Bonds either did not form at all, or if bonds were formed they were of such low order strength that they broke at the adhesive-metal interface during the sawing into strips. For example, if an epoxy formulation was prepared as above except for the substitution of a glycerine based resin such as Shell Epon 812 for the Dow DER 732 or other flexible epoxy resins such as Epon 871, either no bonds formed or they were of such low order strength as to be useless. Similar results were obtained for other formulations which did not incorporate the polyglycol resins.

The specific formulation given above for an epoxy adhesive including a polyglycol resin are merely illustrative. The formulation can be varied within limits and still provide useful bonding to oil contaminated surfaces.

|  | Range | Preferred |
|---|---|---|
|  | (Percent by weight) | |
| Diglycidyl ether of bis phenol-A | 95–50 | 90–70 |
| Polyglycol epoxy resin | 5–50 | 10–30 |
| Polyamine hardener | (1) | (1) |
| Fillers such as calcuim carbonate | (2) | (2) |

1 About 6–14 parts by weight/100 parts resins.
2 0–100 percent by weight of resin.

Dow DER 732 has been noted as being one form of polyglycol diepoxide resin suitable for use in our invention. As a further specific example one may use Dow DER 736 which is a polyglycol resin similar to DER 732 having a somewhat shorter chain length than DER 736.

A variety of hardeners may be used. Generally, the polyamine or polyamide type are preferred. Acid hardeners may be used, but they generally give poorer bonding than the polyamine or polyamides.

When other hardeners are utilized, the quantity of the hardener and cure cycle used will vary depending on the hardener used. The same general rules will apply as above, that is, elevation of temperature provides greater adhesive strength than a room temperature cure. By way of example, in general, polyamide hardeners in a quantity of 20 to 150 parts by weight per 100 parts of epoxy resins may be used. However, we have found that dicyandiamide in quantities of about 6 parts by weight per 100 parts resins is particularly useful in the invention. This material when used as a curing agent in this quantity requires a cure temperature in excess of 300° F. for 1 hour.

Epoxy resin bonding agents in accordance with the invention which incorporate polyglycol epoxy resins can be further modified by use of either active or inactive diluents. These, as is known in the art, are used to change the handling and cure characteristics. The active types include materials such as butyl, cresol, or phenyl glycidyl ethers. Examples of the inactive types are pine oil, polysulfide liquid polymers, dibutyl phthalate, and the terpenes.

What is claimed is:

1. The method of bonding two surfaces together which when clean are capable of being bonded together by an epoxy adhesive when at least one has an oil coated surface to produce a bond having a bond shear strength of at least 400 p.s.i. which comprises:
   (a) forming a solvent-free epoxy resin bonding agent including from about 50 up to about 95 percent by weight of diglycidyl ether of bis phenol A, balance a polyglycol epoxy resin and adding thereto a quantity of hardener;
   (b) applying a thin film of said agent to the surface of at least one of the members to be joined and bringing said film into contact with the surface of the other of the members to be joined, at least one of surfaces having an oil film thereon at the time they are joined; and
   (c) curing the bonding agent.

2. The method in accordance with claim 1 wherein an inert filter is included in the epoxy bonding agent.

3. The method in accordance with claim 1 wherein a quantity of a diluent is included in the epoxy bonding agent.

4. The method in accordance with claim 1 wherein dicyandiamide is used as the hardener and the resin is cured at a temperature approximating 300° F. for about one hour to produce a bond having a bond shear strength of about 2600 p.s.i.

5. The method in accordance with claim 1 wherein the film is from 0.5 to 10 mils in thickness.

6. The method in accordance with claim 1 wherein the epoxy resin has the following composition:
   diglycidyl ether of bis phenol A: 70–90% by weight
   polyglycol epoxy resin: 10–30% by weight
   polyamine hardener: about 6 to about 14 parts by weight per 100 parts of resin.

7. The method in accordance with claim 6 wherein the resin is cured at an elevated temperature.

8. The method in accordance with claim 1 wherein the resin is cured at an elevated temperature.

9. The method in accordance with claim 1 wherein the epoxy resin has the following composition:
   diglycidyl ether of bis phenol A: 80% by weight
   polyglycol epoxy resin: 20% by weight
   polyamide hardener: about 20–150 parts by weight/100 parts of resin.

References Cited

UNITED STATES PATENTS

| 2,575,558 | 11/1951 | Newey et al. | 156—330 |
| 2,951,778 | 9/1960 | Haberlin | 156—330X |
| 3,016,362 | 1/1962 | Wismer | 156—330X |
| 3,032,460 | 5/1962 | Chipman et al. | 156—330X |
| 3,281,491 | 10/1966 | Smith et al. | 260—830 |
| 3,299,168 | 1/1967 | Payne | 161—184X |
| 2,735,829 | 2/1956 | Wiles et al. | 260—830 |
| 3,267,172 | 8/1966 | Arnold | 260—830 |
| 3,299,169 | 1/1967 | Smith | 260—830 |
| 3,316,323 | 4/1967 | Wille et al. | 260—830 |
| 3,355,315 | 11/1967 | Jorda et al. | 117—97 |

FOREIGN PATENTS

| 805,426 | 5/1956 | Great Britain | 156—330 |

JOHN T. GOOLKASIAN, Primary Examiner

D. J. FRITSCH, Assistant Examiner

U.S. Cl. X.R.

161—186; 117—161; 260—2

UNITED STATES PATENT OFFICE
CERTIFICATE OF CORRECTION

Patent No. 3,551,249            Dated December 29, 1970

Inventor(s)    John W. Harp et al.

It is certified that error appears in the above-identified patent and that said Letters Patent are hereby corrected as shown below:

Column 4, line 8, "inert filter" should read -- inert filler --.

Signed and sealed this 25th day of May 1971.

(SEAL)
Attest:

EDWARD M. FLETCHER, JR.           WILLIAM E. SCHUYLER, JR.
Attesting Officer                 Commissioner of Patents